US006399172B1

(12) United States Patent
Carr et al.

(10) Patent No.: US 6,399,172 B1

(45) Date of Patent: Jun. 4, 2002

(54) HINGED PANEL FOR FURNITURE

(75) Inventors: Courtney P. Carr, Columbus; Robert Earl Underwood, Franklin; Paula Marie Foley; Kelly Marie Lemley, both of Columbus, all of IN (US)

(73) Assignee: Rock-Tenn Company, Norcross, GA (US)

( * ) Notice: Subject to any disclaimer, the term of this patent is extended or adjusted under 35 U.S.C. 154(b) by 0 days.

(21) Appl. No.: 09/430,783

(22) Filed: Nov. 17, 1999

(51) Int. Cl.$^{7}$ .............................. B32B 3/08; B32B 3/10

(52) U.S. Cl. .............................. 428/43; 428/61; 428/77

(58) Field of Search ............................ 428/43, 136, 77, 428/151, 61

(56) References Cited

U.S. PATENT DOCUMENTS

| | | | |
|---|---|---|---|
| 3,887,101 | A | 6/1975 | Adachi |
| 3,943,022 | A | 3/1976 | Susnjara |
| 4,033,806 | A | 7/1977 | Lindenschmidt |
| RE30,777 | E | 10/1981 | Ytter |
| 4,701,232 | A | 10/1987 | Werres |
| 4,722,146 | A | 2/1988 | Kemeny |
| 5,515,900 | A | 5/1996 | West et al. |
| 5,665,190 | A | 9/1997 | Sansano Sanz |
| 5,746,871 | A | 5/1998 | Walsh |

*Primary Examiner*—Alexander S. Thomas

(74) *Attorney, Agent, or Firm*—Kilpatrick Stockton LLP

(57) ABSTRACT

A hinged panel which is used as the back-panel of ready-to-assemble furniture. A strip of tape is adhered to one side of a piece of hardboard or similar board of material such as medium density fiberboard or high density fiberboard. The hardboard is die cut along a taped hinge line while the tape is present and remains uncut. Further, one or more knock-out areas are die cut through the entire thickness of the hinged hardboard panel at desired locations on the hinged hardboard panel to allow passage of power cords or other wires or cables, or to allow extension of objects. The hinged panel can be folded at the hinge line and put into a small container with other parts of ready-to-assemble furniture for shipment. Since the hinged panel was originally one piece of board, the unfolded hinge line is almost invisible and each half of the knock-out area that straddles the hinge line matches without the need of aligning.

7 Claims, 2 Drawing Sheets

HINGED PANEL FOR FURNITURE

TECHNICAL FIELD

The present invention relates to panels for ready-to-assemble furniture, and more particularly relates to a foldable fibreboard or hardboard panel having knock-out areas that extend over a hinge line and to a method for manufacturing such a panel.

BACKGROUND ART

In ready-to-assemble furniture such as a bookshelf or a television box, wood or veneered chipboard may be used for the frame and shelves, and paperboard or hardboard may be used to provide the back panel. The furniture manufacturers try to provide the ready-to-assemble parts in containers that are as small as possible. Therefore, it is necessary to divide or fold the backing panels into sections. Panels made of paperboard can be partially die cut to leave some layers of paperboard to serve as a hinge. However, panels made of hardboard or fibreboard cannot be hinged in this manner. Typically, many furniture manufacturers have provided two separate backing panels that must be joined by a plastic trim strip. However, this involves more expense to the manufacturer, and more assembly work by the consumer. Also, the resulting back panel is less attractive. Tape hinges have been used to join two hard panels. For example, two pieces of board may be aligned and tape may be applied over the joint to form a hinge. However, this approach requires careful alignment of the two pieces before applying the hinge.

Further, holes or knock-out areas may be needed in the back panel for power cords. In the case of entertainment centers, it may be necessary to form knock-out areas to accommodate the projecting back of a television. Furniture manufacturers would normally avoid forming such knock-out areas to extend over a hinge, since they would have to align the knock-out areas, in addition to aligning two pieces of hardboard when applying the hinge. This restricts the flexibility of manufacturers in designing certain ready-to-assemble furniture.

There is a need in the art for a hinged panel that does not require careful alignment of the two pieces to form an attractive large panel. There is a further need for a hinged panel that is inexpensive to manufacture and that requires less assembly work. There is also a need for a hinged panel where knock-out areas can be easily formed anywhere in the back panel, even in the area that extends over the hinge.

SUMMARY OF THE INVENTION

The present invention seeks to provide a hinged panel for furniture which does not require careful alignment of the two pieces before applying the hinge. The present invention also seeks to provide a hinged panel that is inexpensive to manufacture and that requires less assembly work. Further, the present invention seeks to provide a hinged panel in which smooth knock-out areas can be easily formed anywhere in the panel even in the area that extends over the hinge. The present invention also seeks to provide a method for manufacturing a panel for furniture described above.

In accordance with the invention, these objects are accomplished by providing a hinged panel in which a piece of board is die cut along a hinge line where a tape is first placed in such a way that the piece of board is die cut while the tape remains uncut. The board may be a medium density fibreboard (MDF) or high density fibreboard (HDF) or hardboard, or any other suitable sheet material. One or more knock-out areas are die cut along the hinge line through both the board and the tape so as to straddle the hinge line. Since newly formed pieces of board at each side of the hinge have originally been one piece, the joint itself is a perfect match and the edges of the newly formed pieces are urged together when the assembly is unfolded, making the joint virtually invisible. Further, since one or more knock-out areas are die cut in such a way that they extend over the hinge line, any knock-out areas straddling the hinge line match precisely to form a smooth opening.

In a preferred embodiment of the invention, a wood-grained covering may be adhered to the board's surface opposite from the side where the tape is placed. By adhering a wood-grained covering to the board surface, the panel matches other components which make up ready-to-assemble furniture, such as wood or veneered chipboard.

In a preferred embodiment, a paper covering may also be adhered to the board's surface so as to cover the tape.

The present invention also provides a method for making a hinged panel, comprising the steps of placing a tape onto a piece of board along a hinge line; die cutting the piece of board from the side opposite the tape along the hinge line; and die cutting one or more knock-out areas through the board and the tape such that the one or more knock-out areas straddle the hinge line.

DETAILED DESCRIPTION OF THE DISCLOSED EMBODIMENT

Figure 1:
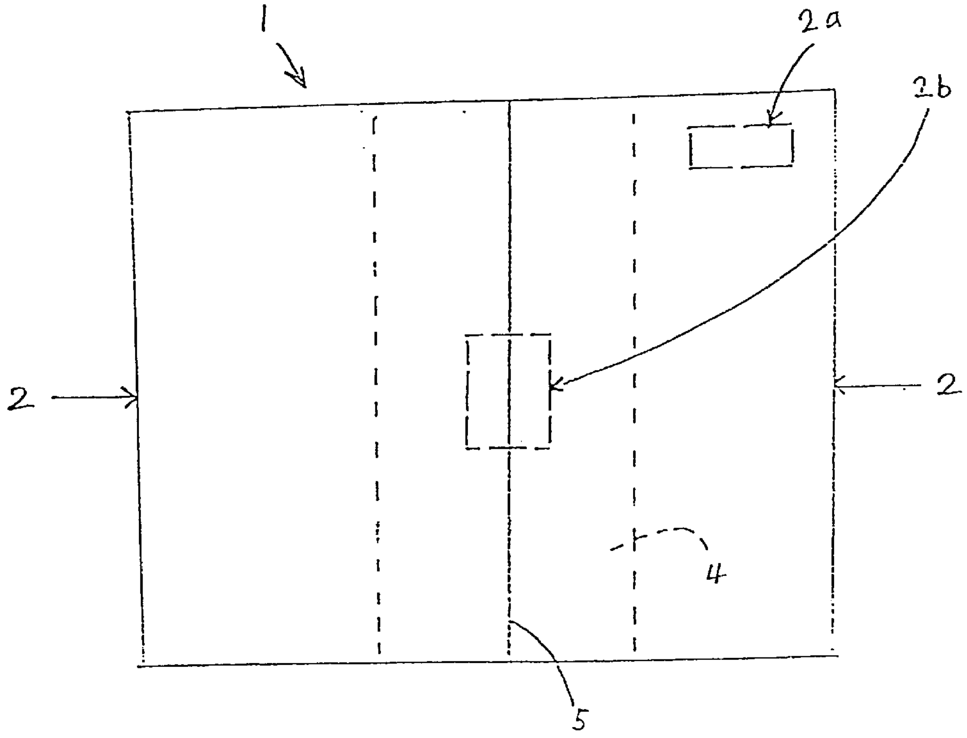
FIG. 1 is a front plan view of a hinged panel having knock-out areas embodying the present invention.
Figure 2:
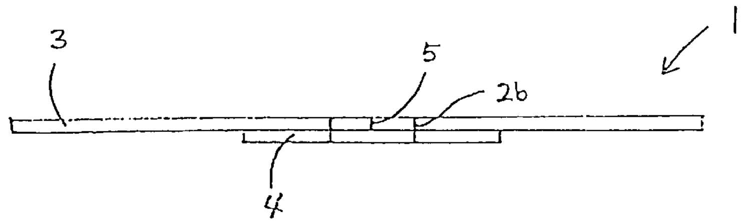
FIG. 2 is a cross sectional view of a hinged panel taken by line 2—2 of FIG. 1.

Referring now in more detail to the drawings, FIG. 1 shows a front view of a hinged panel 1 having die cut “knock-out” areas 2*a*, 2*b* embodying the present invention and FIG. 2 shows a cross sectional view taken by line 2—2 of FIG. 1. Components in the drawings are exaggerated for the purpose of explanation. For a smooth surface, medium density fibreboard (MDF) or high density fibreboard (HDF) may be used for the panel 1. Hardboard may also be used, and will be referred to in the following description of the illustrative embodiment. As shown in FIGS. 1 and 2, the hinged hardboard panel 1 comprises a piece of hardboard 3 of the size of the back panel for ready-to-assemble furniture, on one side of which a tape 4 is adhered. The hardboard 3 is then die cut along a hinge line forming die cut 5 while the tape 4 is present and remains uncut. The tape 4 can be made of non-tearable material such as Tyvek® and serves as a tape hinge. Further, the knock-out areas 2*a*, 2*b* are die cut through the entire thickness of the hinged hardboard panel 1. In this embodiment, one knock-out area 2*a* is die cut through the hardboard 3, while the other knock-out area 2*b* that straddles the hinge line is cut through both the hardboard 3 and the tape 4. These knock-out areas can be formed at any desired locations on the hinged hardboard panel 1 to allow passage of power cords or other wires or cables, or to allow extension of objects.

In manufacturing the hinged hardboard panel of this embodiment, the tape 4 is first placed onto a large piece of hardboard 3 along the hinge line. After the tape 4 is placed, the piece of hardboard 3 is die cut from the front side which is the side opposite the tape 4, to completely cut the hardboard 3, but not through the tape 4. At the same time, the knock-out areas 2*a*, 2*b* can be die cut through the piece of hardboard 3 and also through the tape 4 where the tape 4 is present. The knock-out areas 2*a*, 2*b* can alternatively be die cut before or after the die cut of hardboard 3 has been made. These knock-out areas 2*a*, 2*b* do not necessarily need to be die cut completely but may remain partially connected, as shown, by small remaining areas of board along the die cut, so that a user can open the knock-out areas when needed.

Figure 3:
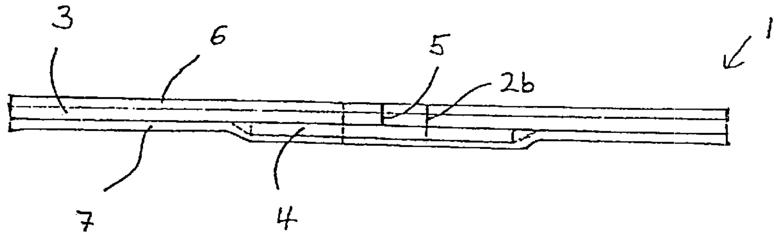
FIG. 3 is a cross sectional view of a hinged panel of FIG. 2 to which a wood-grained covering and a paper covering are laminated.

FIG. 3 shows a cross sectional view of a hinged hardboard panel 1 of FIG. 2 to which a wood-grained covering 6 and a paper covering 7 are laminated. As shown in FIG. 3, the wood-grained covering 6 is laminated onto the side of the hardboard 3 opposite from the tape 4, so that the hinged hardboard panel 1 will match other components made of e.g. wood or veneered chipboard that make up ready-to-assemble furniture. Further, the paper covering 7 is laminated on top of the tape 4 so as to cover the tape. The provision of the paper coverings 6 and 7 may be optional. Any pattern or solid color may be printed onto the coverings 6 and 7. As noted above, a smoother surface can be obtained if the covering 7 is laminated onto a panel 1 comprising a medium or high density fibreboard.

Figure 4:
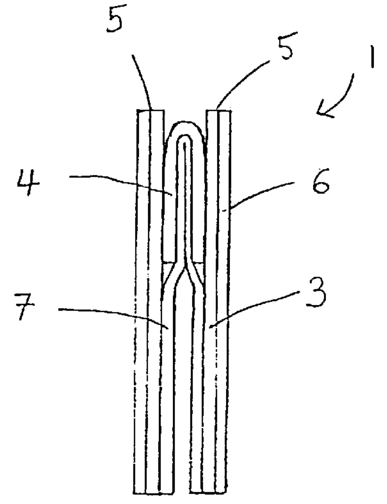
FIG. 4 is an end view of a hinged panel of FIG. 3 which is folded at the hinge line.

In manufacturing the hinged hardboard panel of the embodiment shown in FIG. 3, the piece of hardboard 3 is first laminated with the wood-grained covering 6 and the tape 4 which serves as a tape hinge is placed onto the hardboard 3 at the side opposite from the wood-grained covering 6 along the hinge line. Further, the paper covering 7 is laminated to the hardboard 3 at the side where the tape 4 is provided so as to cover the tape 4. The piece of hardboard 3 having the wood-grained covering 6 is then die cut from the front side where the wood-grained covering 6 is laminated, to completely cut the wood-grained covering 6 and the hardboard 3, but not through the tape 4 and the paper covering 7, forming die cut 5 as shown in FIG. 3. At the same time, the knock-out areas 2*a*, 2*b* can be die cut through the entire width of the hinged hardboard panel 1, through the wood-grained covering 6, the hardboard 3, the paper covering 7, and further through the tape 4 where the tape 4 is present. The knock-out areas 2*a*, 2*b* can alternatively be die cut before or after the die cut of hardboard 3. These knock-out areas 2*a*, 2*b* do not necessarily need to be die cut completely but may remain partially connected so that a user can open the knock-out areas when needed. The paper covering for the tape 4 can be laminated anytime as long as the lamination is made before the knock-out areas 2*a*, 2*b* are formed. The hinged hardboard panel 1 is then folded at the hinge line as shown in FIG. 4 and is put into a small container together with other parts of ready-to-assemble furniture for shipment.

Figure 5:
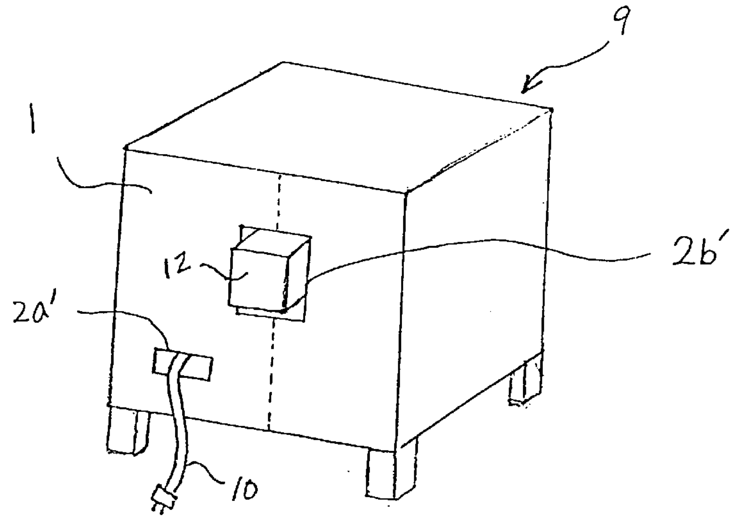
FIG. 5 is a rear perspective view of a TV cabinet in which a hinged panel embodying the present invention is used as the back panel.
Figure 1:
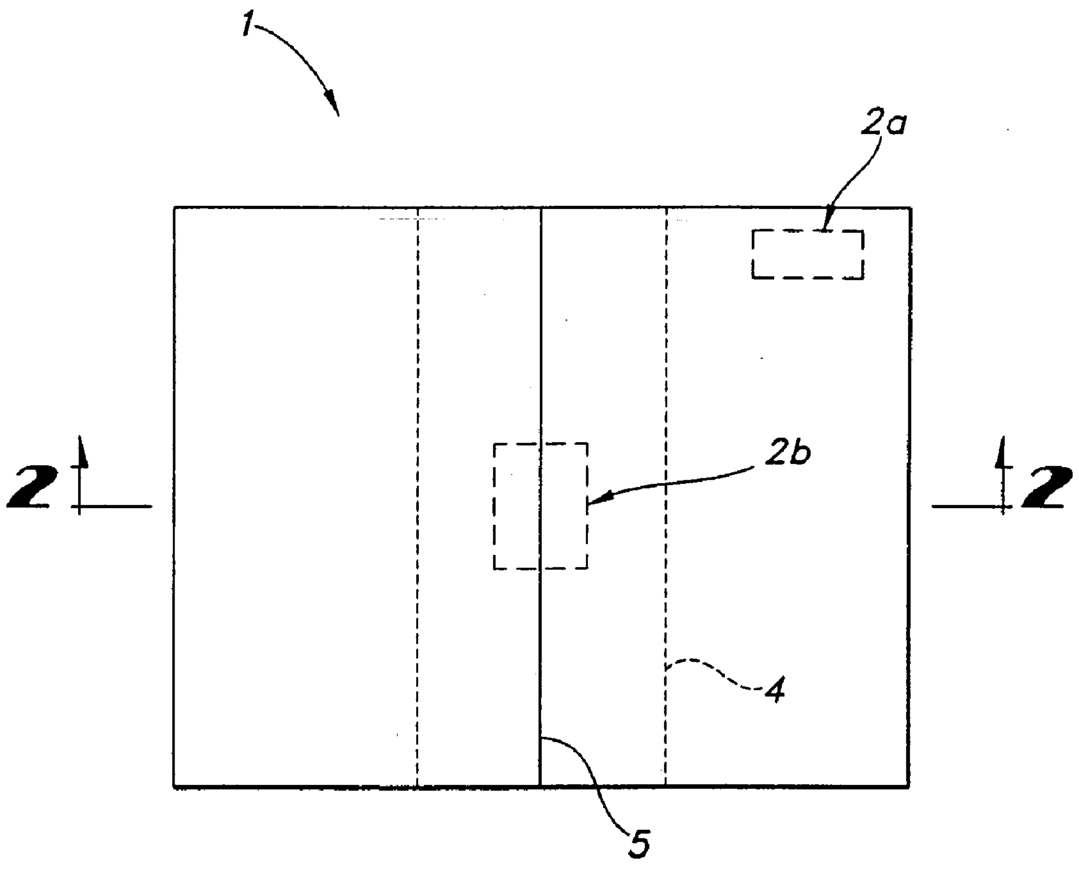
Figure 2:
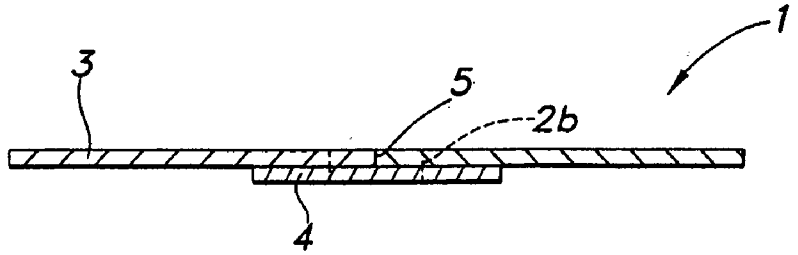
Figure 3:
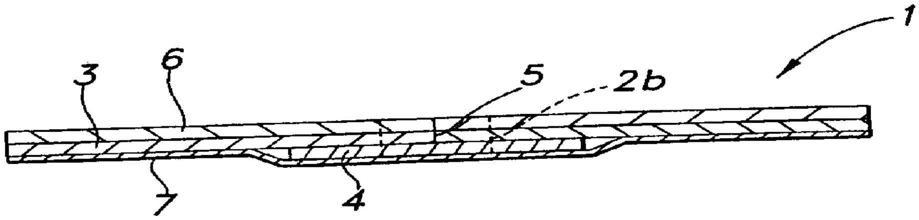
Figure 4:
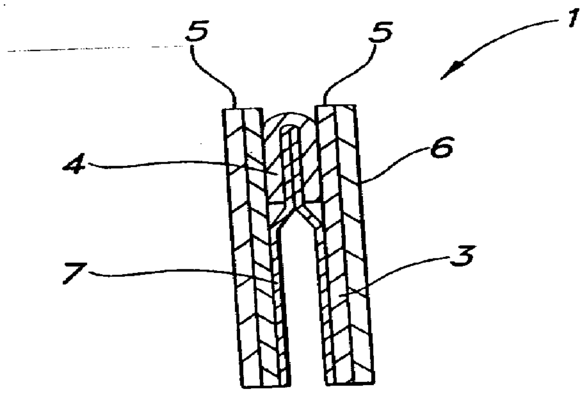
Figure 5:
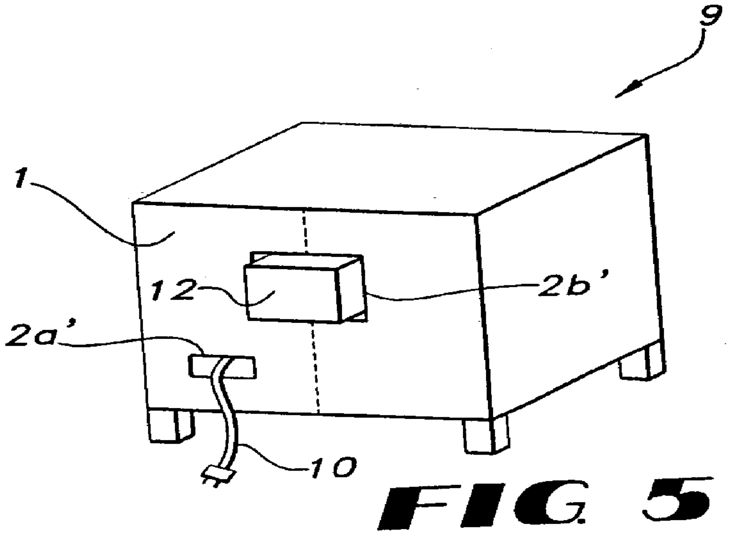

FIG. 5 is a rear perspective view of a TV cabinet 9 in which a hinged hardboard 1 is used as the back panel, showing one example of use of the hinged hardboard panel embodying the present invention. As shown in FIG. 5, a knock-out area 2*a*' is formed at one side of the hinge line to allow the passage of a power cord 10. A knock-out area 2*b*' is formed such that it straddles the hinge line to accommodate the projecting back 12 of the television. Since the hinged hardboard panel 1 was originally one piece of hardboard, the unfolded hinge line is almost invisible. Each half of the knock-out area 2*b*' matches perfectly without the need of aligning them by the consumer.

From the foregoing description, it can be seen that a hinged panel according to the present invention does not require careful alignment of the two pieces to form an attractive large panel. Further, smooth and perfectly aligned knock-out areas can be easily formed anywhere in the hinged panel even in the area that straddles the hinge line.

While this invention has been described in detail with particular reference to preferred embodiments thereof, it will be understood that modifications and variations may be made without departing from the scope of the invention as defined in the appended claims.

What is claimed is:

1. A hinged panel for furniture comprising:

a piece of board having a tape placed along a location for a hinge line, the piece of board being die cut along the hinge line while the tape is present and remains uncut; and one or more knock-out areas being die cut through the board and the tape such that the one or more knock-out areas straddle the hinge line.

2. A hinged panel for furniture according to claim 1 further comprising a wood-grained covering adhered to the board surface opposite from the side where the tape is placed.

3. A hinged panel for furniture according to claim 2 further comprising a paper covering adhered to the board surface so as to cover the tape.

4. A hinged panel for furniture according to claim 1 further comprising a paper covering adhered to the board surface so as to cover the tape.

5. A hinged panel for furniture according to claim 1 wherein the board is medium density fibreboard.

6. A hinged panel for furniture according to claim 1 wherein the board is high density fibreboard.

7. A hinged panel for furniture according to claim 1 wherein the board is hardboard.

* * * * *

UNITED STATES PATENT AND TRADEMARK OFFICE

CERTIFICATE OF CORRECTION

PATENT NO. : 6,399,172 B1 
DATED : June 4, 2002
INVENTOR(S) : Courtney P. Carr et al.

It is certified that error appears in the above-identified patent and that said Letters Patent is hereby corrected as shown below:

The Title page should be deleted and substitute therefore the attached title page.

Drawings,
Delete Drawing Sheets 1-2 (Figures 1-5) and substitute therefore the attached Drawing Sheets 1-2 (Figures 1-5) as shown on the attached pages.

Signed and Sealed this

Twenty-seventh Day of May, 2003

JAMES E. ROGAN
*Director of the United States Patent and Trademark Office*

(12) United States Patent
Carr et al.

(10) Patent No.: US 6,399,172 B1
(45) Date of Patent: Jun. 4, 2002

(54) HINGED PANEL FOR FURNITURE

(75) Inventors: Courtney P. Carr, Columbus; Robert Earl Underwood, Franklin; Paula Marie Foley; Kelly Marie Lemley, both of Columbus, all of IN (US)

(73) Assignee: Rock-Tenn Company, Norcross, GA (US)

( * ) Notice: Subject to any disclaimer, the term of this patent is extended or adjusted under 35 U.S.C. 154(b) by 0 days.

(21) Appl. No.: 09/430,783

(22) Filed: Nov. 17, 1999

(51) Int. Cl.[7] .............................. B32B 3/08; B32B 3/10
(52) U.S. Cl. .............................. 428/43; 428/61; 428/77
(58) Field of Search .............................. 428/43, 136, 77, 428/151, 61

(56) References Cited

U.S. PATENT DOCUMENTS

| | | | |
|---|---|---|---|
| 3,887,101 | A | 6/1975 | Adachi |
| 3,943,022 | A | 3/1976 | Susnjara |
| 4,033,806 | A | 7/1977 | Lindenschmidt |
| RE30,777 | E | 10/1981 | Ytter |
| 4,701,232 | A | 10/1987 | Werres |
| 4,722,146 | A | 2/1988 | Kemeny |
| 5,515,900 | A | 5/1996 | West et al. |
| 5,665,190 | A | 9/1997 | Sansano Sanz |
| 5,746,871 | A | 5/1998 | Walsh |

*Primary Examiner*—Alexander S. Thomas
(74) *Attorney, Agent, or Firm*—Kilpatrick Stockton LLP

(57) ABSTRACT

A hinged panel which is used as the back-panel of ready-to-assemble furniture. A strip of tape is adhered to one side of a piece of hardboard or similar board of material such as medium density fiberboard or high density fiberboard. The hardboard is die cut along a taped hinge line while the tape is present and remains uncut. Further, one or more knock-out areas are die cut through the entire thickness of the hinged hardboard panel at desired locations on the hinged hardboard panel to allow passage of power cords or other wires or cables, or to allow extension of objects. The hinged panel can be folded at the hinge line and put into a small container with other parts of ready-to-assemble furniture for shipment. Since the hinged panel was originally one piece of board, the unfolded hinge line is almost invisible and each half of the knock-out area that straddles the hinge line matches without the need of aligning.

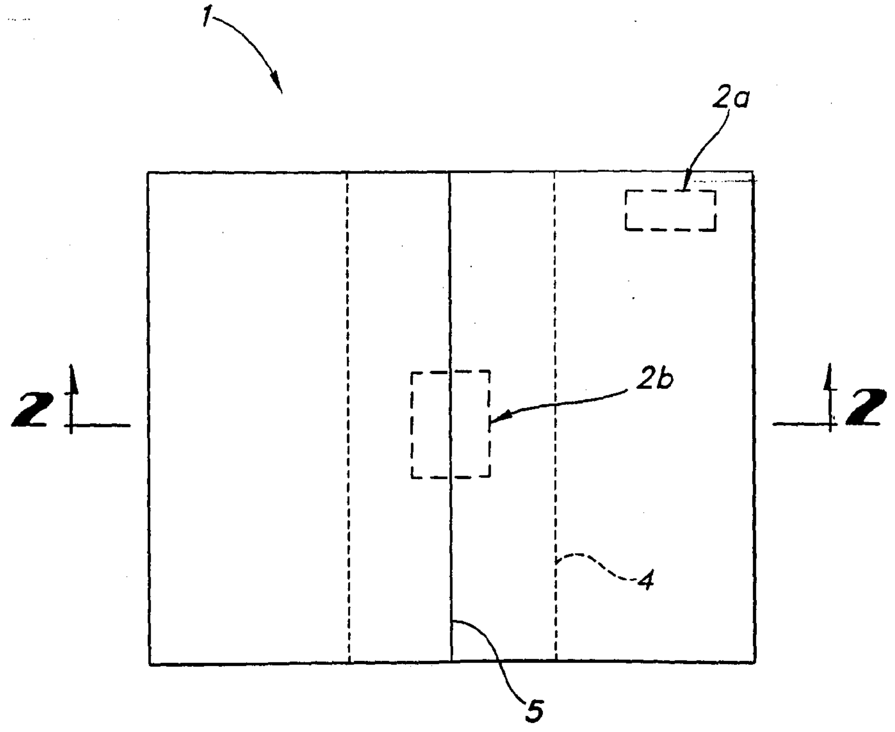

7 Claims, 2 Drawing Sheets